United States Patent Office 2,968,628

Patented Jan. 17, 1961

1

2,968,628

PROPELLANT COMPOSITION

Winston H. Reed, Trumbull, Conn., assignor to Shulton, Inc., Clifton, N.J., a corporation of New Jersey No Drawing. Filed Oct. 17, 1958, Ser. No. 767,758

8 Claims. (Cl. 252—305)

This invention relates to a novel propellant composition and, more particularly, it pertains to a propellant composition which is especially suitable for use in aqueous systems.

Propellants such as hydrocarbons and halocarbons are being used extensively for the purpose of expressing a wide assortment of materials from pressurized containers. The type of propellant selected for a particular system depends upon its availability, cost, reactivity, resistance to degradation, flammability, etc. From the time that a propellant composition is packaged to the time of its use by the consumer may involve a period of one year or more, and for that reason the reactivity of the propellant composition becomes an extremely important factor. It is noted that in aqueous systems relatively few materials can be employed for one reason or another. The hydrocarbons per se are non-reactive but their use is prohibited by their flammability characteristics. On the other hand, the halocarbons, while being generally nonflammable, possess to some degree the ability to react with water upon standing in contact therewith for an appreciable period of time. At present, dichlorodifluoromethane and tetrafluorodichloroethane are used in aqueous systems. These halocarbons will react with water after a long period of standing. However, to minimize this effect, the pH of the system is maintained at about 7. The reactivity of the halocarbons is a serious shortcoming to wider exploitation of the halocarbons in the propellant field. The problem of reactivity is especially serious in systems where the pH deviates from the neutral point 7, that is, the system is either acidic or basic. Accordingly, there is a great need for a propellant which can withstand the hydrolytic effect of water on standing for long periods of time.

An object of this invention is to provide a novel propellant composition which is especially suitable for use in aqueous systems.

Another object of this invention is to provide a propellant composition which is non-toxic, highly resistant to the hydrolytic effect of water and possesses a high vapor pressure, thus rendering it especially useful as a propellant in aqueous systems.

Other objects and advantages of this invention will become apparent from the following description and explanation thereof.

In accordance with the present invention, the composition useful as a propellant comprises about 25 to about 33% of isobutane and about 67 to about 75% octafluorocyclobutane.

The propellant composition described above can be used in any kind of pressurized container and with any kind of dispensable material. For example, the propellant can be used to produce foams such as in the case of hand lotions, waxes, hand creams, shoe polishes, furniture polishes, hair lotions, etc., or in the case of water or alcohol systems, such as, for example, insecticides, deodorants, anti-static agents, mold release agents, etc. As previously indicated, however, the propellant of this invention is especially suitable for use in water systems where it is in contact with water for appreciable periods of time. The propellant is essentially non-reactive or unaffected by the hydrolytic effect of water. At ambient temperature levels the propellant of this invention has a sufficiently high vapor pressure to make it especially suitable in foam systems. In foam systems it is desirable that the propellant exert a pressure in excess of 35 p.s.i.g. By using isobutane and octafluorocyclobutane in the relative quantities specified herein the pressure of the system will be greater than 35 p.s.i.g. The propellant of this invention, aside from the advantage of being nonreactive with water, possesses the additional advantage over other halocarbons of emitting vapor from a pressurized container which is essentially of the same composition as the remaining propellant. In the event of an intermittent leak in the vapor space of the container as may occur with some valves, typical mixed halocarbon propellants undergo fractionation, leaving the less volatile component behind and rendering it difficult to dispense substantially all the dispensable material from the container. This defect is not present in the present invention.

To illustrate the vapor pressure characteristic of the propellant of this invention, vapor pressure measurements of typical compositions are given in the following table:

TABLE

| Wt. percent isobutane: | Pressure, p.s.i.a. at 32° F. |
|---|---|
| 22.25 | 29.51 |
| 25.88 | 30.24 |
| 29.13 | 30.20 |
| 30.87 | 30.37 |
| 33.03 | 30.00 |
| 48.85 | 29.17 |

It is noted that liquid compositions containing about 25 to 33% isobutane, emit vapors containing essentially the same compositions as the liquids. Those compositions falling outside the specified range undergo significant fractionation, in that, the liquid shows a higher proportion of the less volatile components as fractionation proceeds. Another important advantage in the composition of this invention is that it possesses a higher vapor pressure than either of the individual propellants, because the propellants in the range described are close in composition to that of the azeotropic mixture of the two compounds. For example, isobutane has a vapor pressure of 30 p.s.i.g. at 70° F., whereas octafluorocyclobutane has a vapor pressure of 25 p.s.i.g. at 70° F. A composition containing 30% isobutane and 70% octafluorocyclobutane has a vapor pressure of 45 p.s.i.g. at 70° F. The specific gravity of the mixture was approximately .960, which means that it floats on top in water systems, a particularly desirable characteristic in those pressurized containers having a standpipe for expulsion of the dispensable material.

Ordinarily, when using dichlorodifluoromethane and tetrafluorodichloroethane in foam systems, it is recommended that the halocarbons comprise about 10% of the total material in the pressurized container. Should the quantity of halocarbons be reduced to 5% or lower, there may be difficulty in removing all of the dispensable material from the container. These conventional halocarbon mixtures undergo significant fractionation resulting in undue vaporization of more volatile component and for that reason 5% of propellant based on the total dispensable material may not be sufficient. This problem is not present in the present invention and, accordingly, the propellant can be about 2 to about 10%, based on the total weight of the composition. However, it is preferred that the propellant comprise about 2 to about 8% by weight, on the same basis. The vapor pressure of the propellant of this invention is essentially the same over the entire life of the packaged material.

As indicated above, the propellant of this invention is non-toxic and essentially unaffected by the hydrolytic effect of water. When a conventional halocarbon is used in aqueous systems having a pH of either 3.5 to 6 or 8 to 10, it is found that the halocarbon reacts to a significant extent with water when standing in contact therewith for a period of less than one year. On the other hand, the propellant of this invention is essentially non-reactive with water under the same conditions.

For the purpose of illustration, the following specific examples are given of the present invention:

*Example 1.—Nasal relief spray*

| | Wt. percent |
|---|---|
| Thymol | .10 |
| Menthol | .50 |
| Camphor | .50 |
| Triethylene glycol | 1.40 |
| Dipropylene glycol | 2.50 |
| Ethanol | 34.00 |
| Distilled water | 51.00 |
| Isobutane, 30 wt. percent; Octafluorocyclobutane, 70 wt. percent | 10.00 |
| Total | 100.00 |

*Example 2.—Poison ivy relief*

| | Wt. percent |
|---|---|
| Zirconium oxide (5 microns max.) | 1.00 |
| Benzocaine | 1.00 |
| Camphor | 0.10 |
| Menthol | 0.10 |
| Calamine | 1.00 |
| Isopropyl Myristate | 1.00 |
| Ethanol | 35.80 |
| Water | 55.00 |
| Isobutane, 30 wt. percent; Octafluorocyclobutane, 70 wt. percent | 5.00 |
| Total | 100.00 |

*Example 3.—Neomycin foam*

Prepare foam base as follows:

| | Wt. percent |
|---|---|
| Part A: | |
| Myristic acid | 1.33 |
| Stearic acid | 5.33 |
| Cetyl alcohol | 0.50 |
| Lanolin | 0.20 |
| Isopropyl myristate | 1.33 |
| Part B: | |
| Triethanolamine | 3.34 |
| Glycerine | 4.70 |
| Polyvinylpyrrolidone | 0.34 |
| Distilled water | 82.93 |
| Total | 100.00 |

Part A and Part B are heated to 80° C. separately and are then combined by adding Part B to Part A and continuing with the stirring until cool.

Formulation is completed by adding neomycin sulphate and propellant to the foam base as given below.

| | Wt. percent |
|---|---|
| Foam base | 91.24 |
| Neomycin sulphate | .76 |
| Isobutane, 30 wt. percent; Octafluorocyclobutane, 70 wt. percent | 8.00 |
| Total | 100.00 |

*Example 4.—Burn and bruise ointment*

| | Wt. percent |
|---|---|
| Carboxymethylcellulose | 3.00 |
| Dipropylene glycol | 10.00 |
| Tannic acid | 2.80 |
| Hexachlorophene | .20 |
| Distilled water | 79.00 |
| Isobutane, 30 wt. percent; Octafluorocyclobutane, 70 wt. percent | 5.00 |
| Total | 100.00 |

*Example 5.—Soy sauce spray*

| | Wt. percent |
|---|---|
| La Choy soy sauce | 90.00 |
| Isobutane, 30 wt. percent; Octafluorocyclobutane, 70 wt. percent | 10.00 |
| Total | 100.00 |

*Example 6.—Maple syrup*

| | Wt. percent |
|---|---|
| Log Cabin maple syrup | 95.00 |
| Isobutane, 30 wt. percent; Octafluorocyclobutane, 70 wt. percent | 5.00 |
| Total | 100.00 |

*Example 7.—Marshmallow topping*

| | Wt. percent |
|---|---|
| Marshmallow Fluff | 92.00 |
| Isobutane, 30 wt. percent; Octafluorocyclobutane, 70 wt. percent | 8.00 |
| Total | 100.00 |

*Example 8.—Peanut spread*

| | Wt. percent |
|---|---|
| Homogenized peanut butter | 80.00 |
| Peanut oil to lower viscosity | 10.00 |
| Isobutane, 30 wt. percent; Octafluorocyclobutane, 70 wt. percent | 10.00 |
| Total | 100.00 |

*Example 9.—Cologne*

| | Wt. percent |
|---|---|
| Perfume base | 3.00 |
| Ethanol | 36.00 |
| Distilled water | 54.00 |
| Isobutane, 30 wt. percent; Octafluorocyclobutane, 70 wt. percent | 7.00 |
| Total | 100.00 |

*Example 10.—Hand lotion*

| | Wt. percent |
|---|---|
| Carboxymethylcellulose | 2.00 |
| Glycerin | 13.00 |
| Citric acid | 3.00 |
| Ethanol | 8.00 |
| Lemon perfume | .70 |
| Water | 68.30 |
| Isobutane, 30 wt. percent; Octafluorocyclobutane, 70 wt. percent | 5.00 |
| Total | 100.00 |

*Example 11.—Shave cream*

Prepare foam base as follows:

| | Wt. percent |
|---|---|
| Part A: | |
| Myristic acid | 2.00 |
| Stearic acid | 4.00 |
| Triethanolamine | 3.00 |
| Lanolin oil | .40 |
| Cetyl alcohol | .50 |
| Part B: | |
| Propylene glycol | 3.00 |
| Tween 20 (Atlas Powder Co.) | 5.00 |
| Span 20 (Atlas Powder Co.) | 5.00 |
| Polyvinylpyrrolidone | 1.00 |
| Water | 75.90 |
| Borax | .10 |
| Part C: | |
| Perfume oil | .10 |
| Total base | 100.00 |

Heat A and B to 75° C. until dissolved. Then add Part A to Part B, stir until cool, then add Part C.

| | Wt. percent |
|---|---|
| Shave cream base | 90.00 |
| Isobutane, 30 wt. percent<br>Octafluorocyclobutane, 70 wt. percent | 10.00 |
| Total | 100.00 |

*Example 12.—Tooth paste*

Prepare paste base as follows:

| | Wt. percent |
|---|---|
| Part A: | |
| Calcium sulfate | 18.00 |
| Dicalcium phosphate | 32.00 |
| Sodium lauryl sulphate | 2.10 |
| Sodium alginate | 1.60 |
| Part B: | |
| Glycerin | 14.00 |
| Sorbo (Atlas Powder Co.) | 9.00 |
| Sodium saccharin | .10 |
| Water | 22.20 |
| Part C: | |
| Flavor oil | 1.00 |
| Total base | 100.00 |

Heat Part B to 90° C., stir in Part A, also warmed, and then when cool add Part C.

| | |
|---|---|
| Tooth paste base | 95.00 |
| Isobutane, 30 wt. percent<br>Octafluorocyclobutane, 70 wt. percent | 5.00 |
| Total | 100.00 |

*Example 13.—Insecticide*

| | Wt. percent |
|---|---|
| Pyrethrins | .25 |
| Piperonylbutoxide | 1.55 |
| D.D.T. (dichlorodiphenyltrichloroethane) | 2.00 |
| Tween 20 | .20 |
| Span 20 | .20 |
| Deobase | 5.80 |
| Water | 81.00 |
| Isobutane, 30 wt. percent<br>Octafluorocyclobutane, 70 wt. percent | 9.00 |
| Total | 100.00 |

*Example 14.—Room deodorant*

| | Wt. percent |
|---|---|
| Perfume (solublized) | 1.00 |
| Ethanol | 5.00 |
| Propylene glycol | 3.00 |
| Triethylene glycol | 3.00 |
| Water | 78.00 |
| Isobutane, 30 wt. percent<br>Octafluorocyclobutane, 70 wt. percent | 10.00 |
| Total | 100.00 |

I claim:

1. A propellant composition comprising about 25 to about 33% of isobutane and the remainder octafluorocyclobutane.

2. A propellant composition comprising about 30% isobutane and about 70% octafluorocyclobutane.

3. A two phase propellant composition adapted for dispensing from pressurized containers which comprises a propellant phase containing about 25 to 33% isobutane and the remainder octafluorocyclobutane and a water phase.

4. A two phase propellant composition adapted for dispensing from pressurized containers which comprises about 2 to 10% of a propellant phase containing about 25 to 33% isobutane and about 67 to 75% octafluorocyclobutane and an aqueous phase.

5. The two phase propellant composition of claim 4 wherein the aqueous phase is acidic.

6. A two-phase propellant composition of claim 4 wherein the aqueous phase is basic.

7. An apparatus comprising a pressurized container, the pressurized container containing the two phase composition defined in claim 3.

8. An apparatus comprising a pressurized container, the pressurized container containing the two phase composition defined in claim 4.

References Cited in the file of this patent

UNITED STATES PATENTS

| | | |
|---|---|---|
| 2,655,480 | Spitzer | Oct. 13, 1953 |
| 2,742,321 | Mina | Apr. 17, 1956 |
| 2,849,323 | Young | Aug. 26, 1958 |